US011568633B2

(12) United States Patent
Schlechter et al.

(10) Patent No.: US 11,568,633 B2
(45) Date of Patent: Jan. 31, 2023

(54) FLOORPLAN OF A DESIGN FOR AN INTEGRATED CIRCUIT

(71) Applicant: INTERNATIONAL BUSINESS MACHINES CORPORATION, Armonk, NY (US)

(72) Inventors: Siegmund Schlechter, Lorch (DE); Manuel Beck, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 16/815,248

(22) Filed: Mar. 11, 2020

(65) Prior Publication Data
US 2021/0287036 A1 Sep. 16, 2021

(51) Int. Cl.
*G06F 30/398* (2020.01)
*G06V 10/75* (2022.01)
(Continued)

(52) U.S. Cl.
CPC ........ *G06V 10/757* (2022.01); *G06F 30/3312* (2020.01); *G06F 30/392* (2020.01); *G06F 30/398* (2020.01)

(58) Field of Classification Search
CPC .. G06F 13/16; G06F 13/4068; G06F 13/4265; G06F 30/39; G06F 2119/12; G06F 30/392; G06F 30/394; G06F 30/30; G06F 30/3312; G06F 30/327; G06F 15/8023; G06F 2209/5017; G06F 2209/521; G06F 9/3004; G06F 9/30087; G06F 9/3842; G06F 9/3851; G06F 9/4494; G06F 9/5016; G06F 9/5033; G06F 9/5038; G06F 9/52; G06F 9/522; G06F 9/526; G06F 30/396; G06F 30/398; G06F 1/10; G06F 15/76; G06F 30/33; G06F 2111/04; G06F 2111/20; G06F 2119/06; G06F 30/27; G06F 30/3315;
(Continued)

(56) References Cited

U.S. PATENT DOCUMENTS 8,181,145 B2 5/2012 Rice
2008/0216038 A1* 9/2008 Bose ..................... G06F 30/392
716/118
(Continued)

OTHER PUBLICATIONS

Mell et al., "The NIST Definition of Cloud Computing", National Institute of Standards and Technology, Special Publication 800-145, Sep. 2011, 7 pages.

*Primary Examiner* — Binh C Tat
(74) *Attorney, Agent, or Firm* — Lily Neff

(57) ABSTRACT

A computer-implemented method for comparing a first version of a floorplan of a design for an integrated circuit with a second version. The method comprises (i) generating a timing information for each net in the second version by determining whether timing information is available for the net in the first version; (ii) in case no timing information is available in the first version, generating the timing information for the second version by calculating a spatial distance and timing information between two points of the net using wire length differences between the first version and the second version; (iii) otherwise, generating the timing information for the second version by calculating a spatial distance and timing information between two points of the net using a wire reach table to obtain a wire delay.

18 Claims, 9 Drawing Sheets

(51) Int. Cl.
  *G06F 30/3312* (2020.01)
  *G06F 30/392* (2020.01)
(58) Field of Classification Search
  CPC ............ H01L 21/76886; H01L 23/528; H01L 27/0207; H01L 21/768; H01L 2027/11883; H01L 27/118
  USPC .................................................. 716/100–108
  See application file for complete search history.

(56) References Cited

U.S. PATENT DOCUMENTS

| | | | |
|---|---|---|---|
| 2008/0276209 A1* | 11/2008 | Albrecht | G06F 30/3312 716/113 |
| 2013/0055187 A1* | 2/2013 | Hiromitsu | G06F 30/392 716/122 |
| 2018/0165405 A1 | 6/2018 | Braun | |
| 2018/0330033 A1 | 11/2018 | Liao | |
| 2019/0065656 A1 | 2/2019 | Chakraborty | |

\* cited by examiner

FLOORPLAN OF A DESIGN FOR AN INTEGRATED CIRCUIT

BACKGROUND

The present invention relates in general to data processing systems, in particular, to a computer-implemented method for comparing a first version of a floorplan of a design for an integrated circuit with a second version, as well as a computer program product and a data processing system.

A floorplan is a schematic representation of tentative placement of major functional blocks of an integrated circuit. Prior art processes for optimizing floorplans of the design of integrated circuits use a routed or detailed implementation of a new top level net list followed by a top level timing analyzing detailed timing reports which may be very time consuming.

SUMMARY

A computer-implemented method is proposed for comparing a first version of a floorplan of a design for an integrated circuit with a second version, wherein wires of the electronic circuit are represented as nets in a netlist and wherein the first version comprises timing information representing net delay values as a function of a wire length and/or a wire constraint of signal paths, and wherein the second version is a modification of the first version. The method comprising (i) generating a timing information for each net in the second version by determining whether timing information is available for the net in the first version; (ii) in case no timing information is available in the first version, generating the timing information for the second version by calculating a spatial distance and timing information between two points of the net using wire length differences between the first version and the second version; and (iii) otherwise, generating the timing information for the second version by calculating a spatial distance and timing information between two points of the net using a wire reach table to obtain a wire delay.

Embodiments of the invention cover a rapid process to propose timing assumptions of a floorplan of a new integrated circuit ahead of detailed implementation. The process may be used to automate iterative floorplan changes to meet timing criteria according to a rapid timing determination feedback loop.

The new process may save a lot of time by comparing just wire delays of a reference version of the floorplan and a new net list without the need of a new detailed integration implementation and without the need of a full timing loop. The new process may trade off exact timing against faster turnaround time. A new proposed wire delay may be calculated by using a technology dependent wire reach table.

Further, a favourable computer program product is proposed for comparing a first version of a floorplan of a design for an integrated circuit with a second version, wherein wires of the electronic circuit are represented as nets in a netlist and wherein the first version comprises timing information representing net delay values as a function of a wire length and/or a wire constraint of signal paths, and wherein the second version is a modification of the first version. The computer program product comprises a computer readable storage medium having program instructions embodied therewith, the program instructions executable by the computer system to cause the computer system to perform a method comprising: (i) generating a timing information for each net in the second version by determining whether timing information is available for the net in the first version; (ii) in case no timing information is available in the first version, generating the timing information for the second version by calculating a spatial distance and timing information between two points of the net using wire length differences between the first version and the second version; and (iii) otherwise, generating the timing information for the second version by calculating a spatial distance and timing information between two points of the net using a wire reach table to obtain a wire delay.

Further, a data processing system for execution of a data processing program is proposed, comprising computer readable program instructions for performing the method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
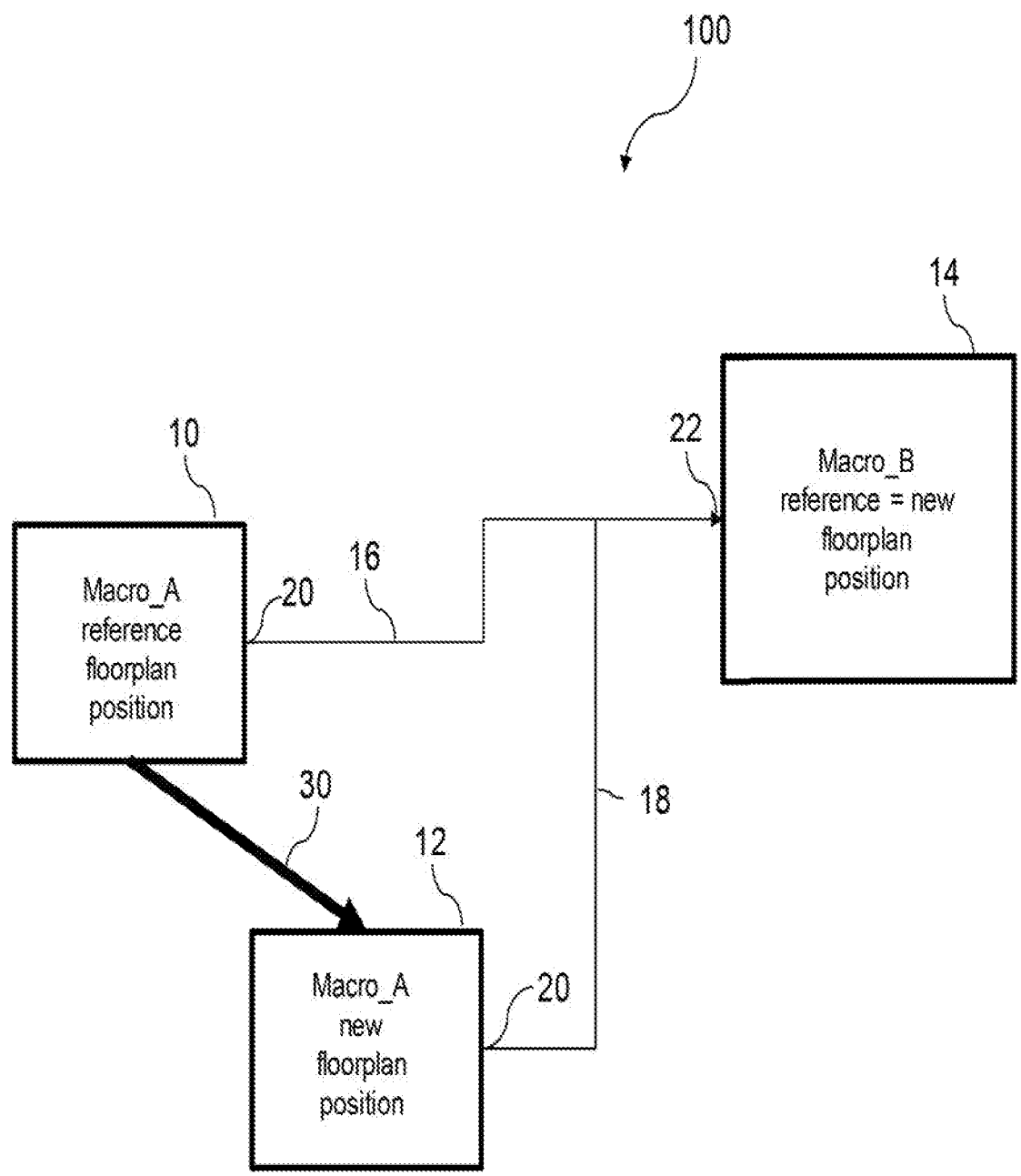
FIG. 1 depicts an example for a macro movement in a top level floorplan according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for comparing a first version of a floorplan of a design for an integrated circuit with a second version, wherein wires of the electronic circuit are represented as nets in a netlist and wherein the first version comprises timing information representing net delay values as a function of a wire length and/or a wire constraint of signal paths, and wherein the second version is a modification of the first version.

The illustrative embodiments may be used for the method comprising (i) generating a timing information for each net in the second version by determining whether timing information is available for the net in the first version; (ii) in case no timing information is available in the first version, generating the timing information for the second version by calculating a spatial distance and timing information between two points of the net using wire length differences between the first version and the second version; (iii) otherwise, generating the timing information for the second version by calculating a spatial distance and timing information between two points of the net using a wire reach table to obtain a wire delay.

The illustrative embodiments are sometimes described herein using particular technologies only as an example for the clarity of the description.

FIG. 1 depicts an example for a macro movement in a top level floorplan according to an embodiment of the invention.

Wires of the electronic circuit are represented as nets 16, 18 in a netlist and wherein the first version comprises timing information representing net delay values as a function of a wire length and/or a wire constraint of signal paths. A second version of the floorplan, also called the new floorplan, is a modification of the first version.

Macro_A 10 represents a first version floorplan position of a logical block of an integrated circuit as a reference.

In the following, the first version of the floorplan is also named the reference version, whereas the second version of the floorplan is named the new version.

Macro_B 14 may be a second block of the integrated circuit in the first version floorplan. For a new design of the integrated circuit Macro_A 10 may be moved to a new second version floorplan position, represented by Macro_A 12. The movement is indicated by arrow 30.

Macro_B 14 may stay at its first version floorplan position. Thus for Macro_B 14, the first version floorplan position as a reference position may be equal to the second version floorplan position as a new position.

Macro_A 10 may be connected from its source pin 20 via the net 16 to a sink pin 22 of Macro_B 14. The second version Macro_A 12 may be connected from its source pin 20 via the new net 18 to Macro_B 14. The length of the first net 16 may be not equal to the length of the second net 18.

According to the proposed method, timing information may be generated for each net 16, 18 in the second version by determining whether timing information is available for the net 16, 18 in the first version.

In case no timing information is available in the first version, the timing information for the second version may be generated by calculating a spatial distance and timing information between two points of the net 16, 18 using wire length differences between the first version and the second version.

In case timing information is available in the first version, the timing information for the second version may be generated by calculating a spatial distance and timing information between two points of the net 16, 18 using a wire reach table to obtain a wire delay.

Thus, the second version of the floorplan 100 may be a modification of the first version without timing information of the first version.

According to an advantageous embodiment, the timing information generated for the second version may comprise at least a classification for the net 16, 18 in comparison with the first version.

Further, the timing information generated for the second version may be used to determine whether a predefined timing criterion is met for the second version. Advantageously, the timing criterion may comprise a figure of merit representing a sum of net delay values as a function of a wire length and/or a wire constraint of signal paths.

Thus, the second version of the floorplan 100 may be optimized based on the figure of merit by minimizing the sum of net delay values as a function of a wire length and/or a wire constraint of signal paths. The figure of merit may advantageously comprise a sum of negative values of arrival times of a signal at any point in the floorplan 100 required to meet a timing criterion.

Calculating a spatial distance and timing information between two points of the net 16, 18 may advantageously be achieved by calculating a shortest distance between two points of the net 16, 18 using orthogonal branches of the net 16, 18, in particular by calculating Steiner net lengths.

Further, the net list may comprise nets 16, 18 represented by net names comprising wires between the source pin 20 and the at least one sink pin 22, and two dimensional coordinates of the source pin 20 and the at least one sink pin 22.

Advantageously, timing information may comprise signal arrival times on each source pin 20 and each sink pin 22, whereas the signal arrival times are read out from the floorplan 100 of the first version or an additional timing report. A wire delay value may be calculated by subtracting a signal arrival time of a source pin 20 from a signal arrival time at a sink pin 22.

Advantageously, the wire reach table may comprise wire delay values for a wire length of signal paths of the second version compared to a wire length of signal paths of the first version.

According to an advantageous embodiment timing information for the second version may be generated at least for single logic elements of the floorplan.

Advantageously, wires may be tagged with net categories according to the determined timing information between two points of the net 16, 18. Further, nets 16, 18 of the second version may be grouped into buckets according to tagging information.

According to embodiments of the proposed method, all nets 18 of moved instances may be compared to the same nets 16 in the reference floorplan. Therefore, the net names 16, 18 and their source pins 20 and sink pins 22 need to match in both floorplans.

If there is no timing information available in the reference design, the method may assess the move using net length differences based on the determination of Steiner net lengths. Steiner net lengths is the shortest connection between two or more points, e.g. a source pin 20 and a sink pin 22, using orthogonal branches only. A Steiner netlist is a list comprising Steiner net lengths for all connections in a floorplan.

If timing information is available in the first version floorplan, the move of the Macro_A 10 may be assessed using a timing estimation for the second floorplan based on determined Steiner net lengths and a look-up in a technology dependent wire reach table.

If the floorplan change does not meet a slack target, where a slack indicates the amount of time between a required arrival time of a signal at any point in order to meet some timing criterion, different floorplan changes may be tried until the slack is optimized.

A figure of merit may represent the sum of all negative slacks. A usual tagging/repowering flow may start as soon as the figure of merit and the worst slack are minimized by floorplan changes.

Figure 2:
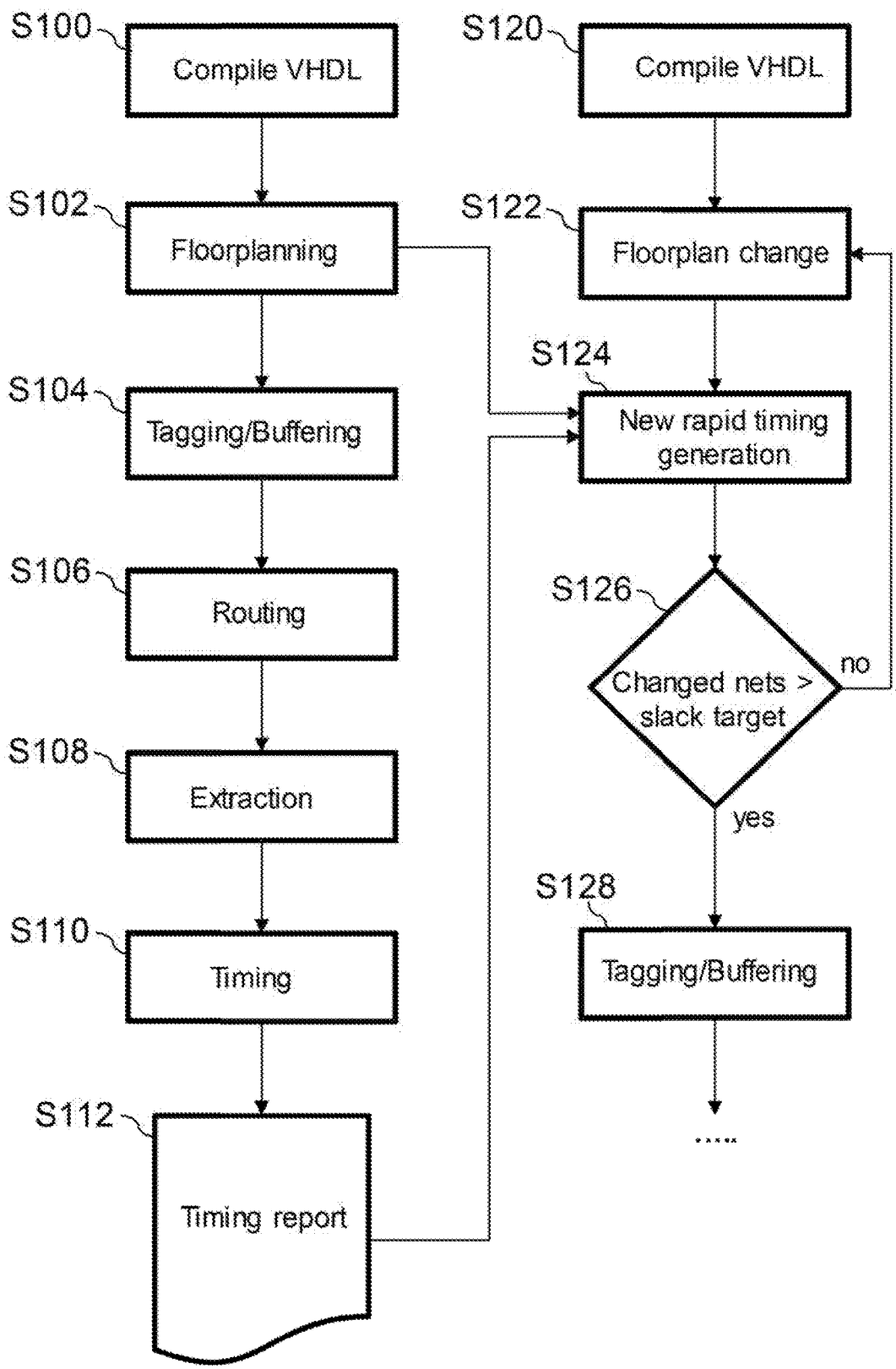
FIG. 2 depicts a top level flowchart of the method comparing a first version of a floorplan of a design for an integrated circuit with a second version according to an embodiment of the invention.

FIG. 2 depicts a top level flowchart of the method comparing a first version of a floorplan of a design for an integrated circuit with a second version according to an embodiment of the invention.

In the left column of the flowchart in FIG. 2, steps S100 to S112, the flow for generating timing information for the first version floorplan, the reference floorplan, is depicted. It may be started with step S100 by compiling the layout of the chip represented by a Hardware Description Language (e.g. VHDL, Verilog or even schematic entry), followed by step S102, where the floor planning is executed. Next in step S104, tagging and/or buffering may be performed, followed by the routing step S106. In step S108 a net extraction is done. Next in step S110, the timing information may be generated, resulting in a timing report, S112.

For changing the design of the chip, a new run may be performed starting with step S120 by compiling the changed design in HDL. Then a floorplan change may be executed in step S122. Next in step S124, a new rapid timing information may be generated by including the floorplan as well as the timing report of the first version floorplan of the chip. Then it is checked in step S126, whether the timing information of the changed nets of the second version exceed the target for the slack. If this is not the case, the loop may be repeated with a new floorplan change in step S122.

If the slack target as a timing criterion is met, tagging/repowering may be performed in step S128 and the process may be ended.

Thus, the proposed method needs a first reference iteration to evaluate floorplan changes in the second iteration. Advantageously this may offer the possibility to improve the floorplan before continuing with the second iteration. Even an untagged, unbuffered, unrouted or untimed reference floorplan may thus be used to compare against a new changed floorplan implementation.

Further, according to the proposed method, it is possible to place and route every single logic element of the chip. Advantageously, the floorplan optimization is independent of placement restrictions.

The proposed method according to an embodiment of the invention may be used in the fields of core and chip timing, respectively integration, to estimate floor plan changes in terms of timing validation, as e.g. cycle time behaviour of a new chip floorplan, prior detailed integration implementation happens.

The method may be mainly used for comparing two different core/chip floorplan implementations against each other. And as a new floorplan gets established the method can also be used to optimize results without having detailed routing information as well as detailed timing abstracts available.

A list may be generated showing all common net names of two implementations and their Steiner net lengths, wire delays, old slacks and proposed new slacks. The method may use an assumption of a certain wire delay per mm of wire in order to calculate the new proposed delays and slacks.

A Steiner net list length extraction may give the net name between the pin of a sending instance, the source pin, and the pin of a receiving instance, the sink pin, and their accompanying Steiner net length. This transform may be executed for all nets of the two designs to be compared against each other.

Two lists, a RSNLL (Reference Steiner net Length List) and a NSNLL (New Steiner net Length List) may be generated. Both lists may contain a net name, source instance pin name, sink instance pin name and the Steiner net length.

If a triple of net name/sink instance pin name/source instance pin name of the NSNLL matches an equal RSNLL entry their corresponding timing information as wire delays for rising and falling edges as well as their slacks may be examined from an existing detailed timing report representing the RSNLL.

The arrival time difference in the detailed timing report between the source—and sink instance pins gives the reference wire delay including buffer delays if implemented.

A new wire delay for the NSNLL entry may be calculated based on the Steiner net length and a technology wire delay table which gives the best delay achievable independent of a routing possibility.

An additional delay is the difference between reference—and new wire delay.

The proposed slack is the worst slack out of rising and falling slack of the reference design plus additional delay.

A formatted output report may give for every net name match its net name, the sink instance pin name, source instance pin name, reference Steiner net length, new Steiner net length, reference worst slack, new slack, reference wire delay, new wire delay, additional wire delay and the proposed slack.

Reports for negative proposed slacks, for not matching net names and for skipped net names, i.e. net names which have no valid timing information, may be generated in addition.

Also, some statistics may be generated, e.g.: The amount of found RSNLL NSNLL nets, amount of found input and output pins, amount of valid data signals as well as the number of failing slacks. A figure of merit (FOM), a single figure representing all added negative slacks and a second FOM reflecting negative slacks lower than a configurable value for negative slacks and a slack table showing the figures of negative slacks for every 10 ps may be covered as well.

Figure 3:
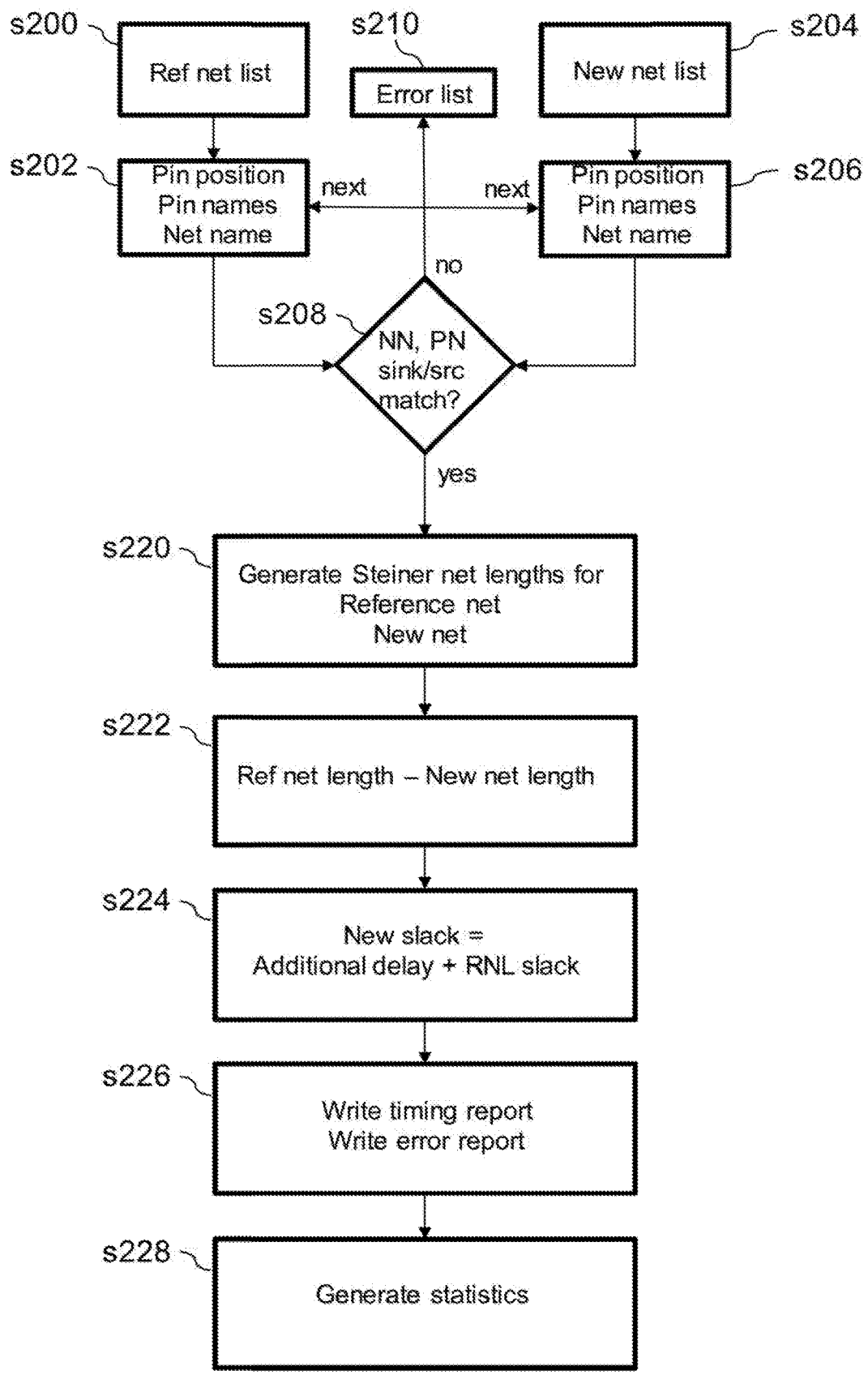
FIG. 3 depicts a flow chart for the proposed method according to an embodiment of the invention.

FIG. 3 depicts a flow chart for the proposed method to propose cycle time behavior of a new chip floorplan ahead of detailed implementation according to an embodiment of the invention.

In step S200, the reference net list is generated for the first version floorplan. In step S202, pin position, pin names, net names may be registered. The same steps may be carried for the second version floorplan in steps S204, S206. In step S208, it is checked whether the net names, the pin names and sink and source pins are matching. If this is not the case an error list is reported in step S210, followed by looping again with the next nets in steps S202, S206.

If net names, the pin names and sink and source pins are matching, then Steiner net lengths may be generated for the first version reference net and the new second version net in step S220, followed by generating the difference between the net lengths for the reference net and the new net in step S222. In step S224, the new slack may be determined from the changed delay value and the slack for the reference net length.

In step S226, timing report and error report may be generated, followed by generating statistical information in step S228.

Figure 4:
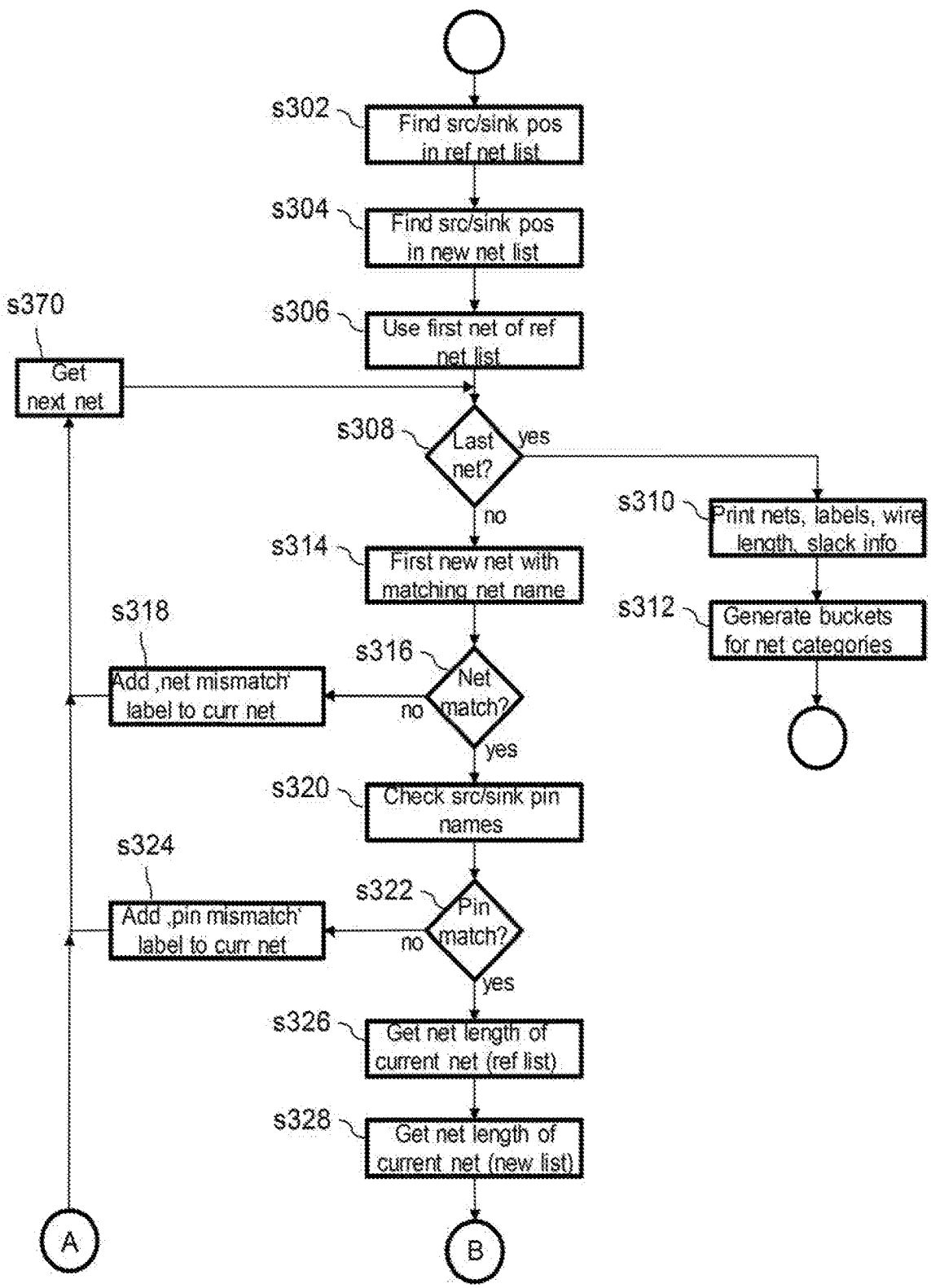
FIG. 4 depicts a first part of a detailed flow chart for the proposed method according to an embodiment of the invention.
Figure 5:
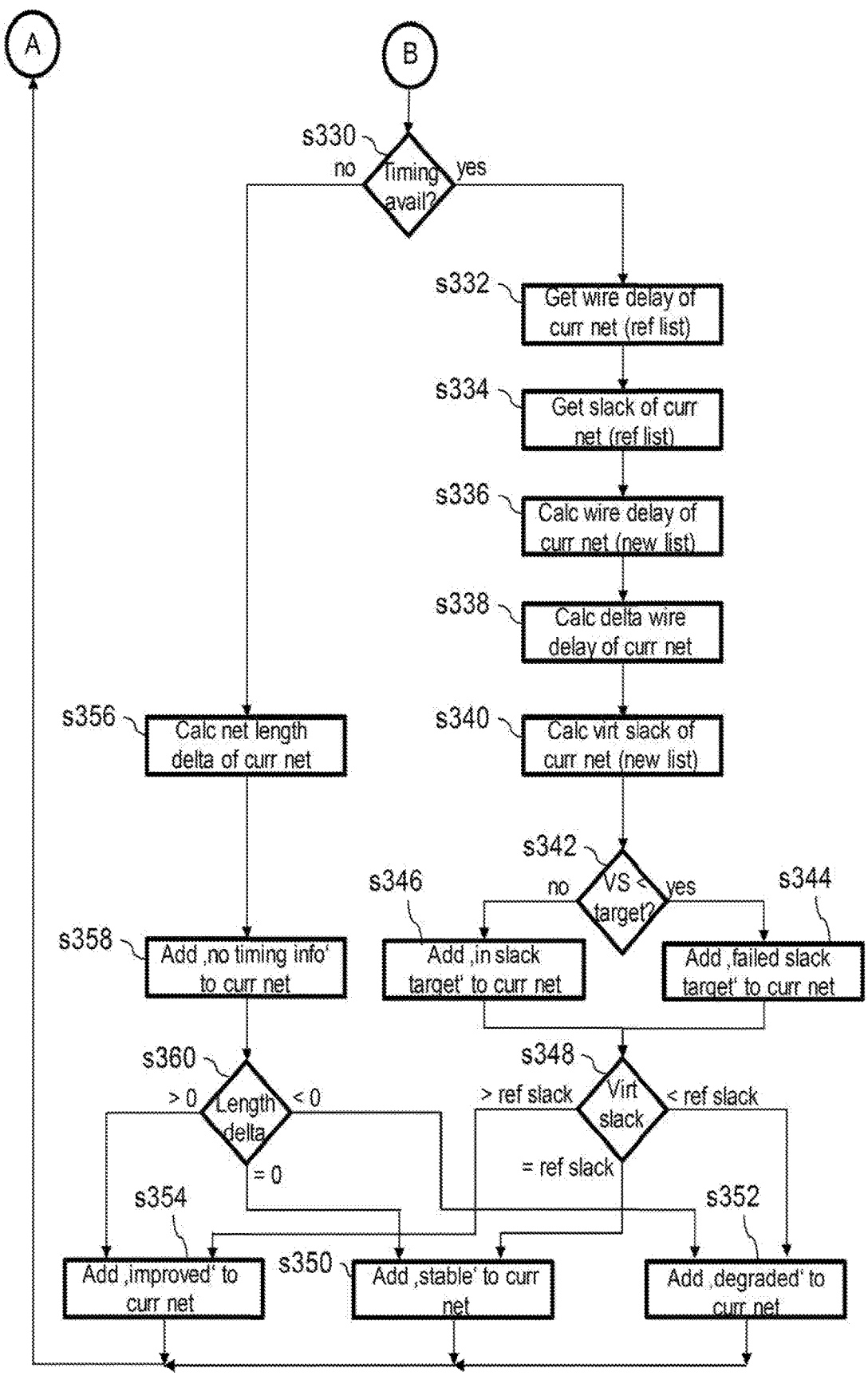
FIG. 5 depicts the second part of the detailed flowchart according to FIG. 4.

FIG. 4 depicts a first part of a detailed flow chart for the proposed method according to an embodiment of the invention, whereas FIG. 5 depicts the second part of the detailed flowchart according to FIG. 4. Respective connection points are labelled with A and B.

A reference net list and a new net list may be required according to the proposed method. Net names, their source pins and sink pins as well as their pin two dimensional x,y coordinates may be extracted for both net lists.

For each net on the reference net list timing information of the arrival time on every corresponding source pin and sink pin may be read out either from the design itself or an additional timing report.

If a match of a net name with their associated source pin and sink pin in both net lists happens and no timing information on the reference net is available, a label "no timing info" may be applied on this net.

However, the net length difference between the reference net and the new net allows to add further labels as "improved", if the new net is shorter, "stable", if it remains the same length or "degraded", in case of a longer new net.

If timing information of a reference net is available, a wire delay of the reference net may be calculated by subtracting the source pin arrival time from the sink pin arrival time. A wire reach table lookup may give a new wire delay for the new net length to be compared with the reference wire delay.

The wire delay delta may be added to the reference slack which gives the new virtual slack.

In case the new virtual slack is more positive or is equal to the virtual slack target, a label "in slack target" may be added.

A label "failed slack target" may be applied, if the new virtual slack is more negative than the virtual target slack.

The process may add the labels "improved", in case of a more positive new virtual slack, "stable", in case of equal slacks or "degraded", if the new virtual slack gets more negative than the reference net slack.

Finally buckets for all flags may be generated to allow sorting out problems fast.

Process flow in FIG. 4 starts in step S302 by finding source pin and sink pin positions of each net in the reference net list, followed by finding source pin and sink pin positions of each net in the new net list in step S304. Then a first net of the reference net list may be chosen from the reference net list in step S306.

If this is the last net, which is checked in step S308, nets may be printed with their labels, wire length and slack information in step S310 and buckets for the net categories according the net labels generated in step S312. Then the process may end.

If this is not the last net, the process may continue in step S314 by finding the current net in the new net list with a matching net name. In step S316, it is checked whether the net name matches.

If this is not the case, a 'net mismatch' label may be added to the current net in step S318 in order to get the next net in step S370.

If the nets match, then the source pin and sink pin names of the current net may be checked between the reference and the new net list in step S320. If the pin names do not match in step S322, a 'pin mismatch' label may be added to the current net in step S324, returning to getting the next net in step S370.

If the pin names match, then the net length of the current net may be obtained from the reference net list in step S326, followed by getting the net length of the current net from the new net list in step S328.

Next, in step S330 of FIG. 5, it is checked, whether there is timing information available for the reference version.

If this is the case, in step S332, the wire delay value of the current net may be obtained from the reference net list, followed by getting the slack of the current net from the reference list in step S334.

In step S336, the wire delay of the current net may be calculated in the new net list, followed by calculating a delta wire delay of the current net in step S338 from a net delay between the reference and the new net list.

Then, in step S340, a virtual slack for the current net in the new net list may be calculated, by adding the slack of the current net in the reference net list and the delta wire delay, calculated in step S338.

Next, in step S342, it is checked, if the virtual slack is less than the slack target as a timing criterion. If this is the case, in step S344 a 'failed slack target' label may be added to the current net. If this is not the case, in step S346 a 'in slack target' label may be added to the current net.

Then, in step S348, the value of the virtual slack may be checked.

If it is greater than the reference slack, a label 'improved' may be added to the current net in step S354, proceeding by getting the next net in step S370.

If the virtual slack is equal to the reference slack, a label 'stable' may be added to the current net in step S350, proceeding by getting the next net in step S370.

If the virtual slack is less than the reference slack, a label 'degraded' may be added to the current net in step S352, proceeding by getting the next net in step S370.

If timing information is not available in step S330, a net length delta for the current net in the new net list may be calculated in step S356, by taking into account the difference between the old and the new net length. A label 'no timing info' may be added to the current net in step S358, followed by checking the net length delta in step S360.

If the net length delta is greater than zero, the label 'improved' may be added in step S354. If the net length delta is equal to zero, the label 'stable' may be added in step S350 and if the net length delta is less than zero, the label 'degraded' may be added in step S352. The flow is then continued by getting the next net in step S370.

Figure 6:
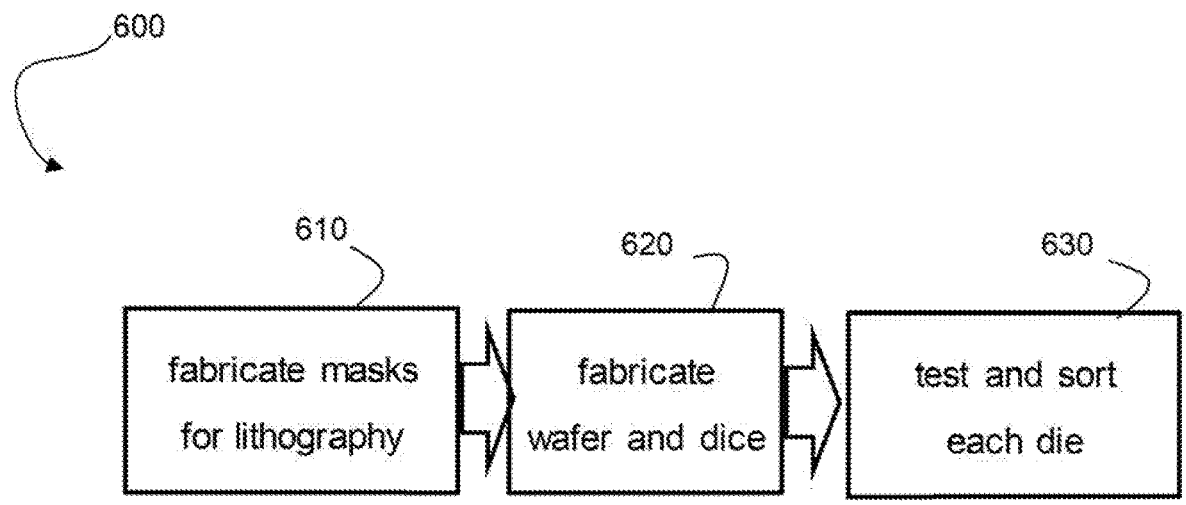
FIG. 6 depicts an example embodiment of an integrated circuit manufacturing process based on the proposed method with respect to the floor plan comparison according to an embodiment of the invention.

Referring now to FIG. 6, a schematic of an example of an integrated circuit manufacturing process based on the proposed method with respect to the floor plan comparison is shown according to an embodiment of the invention. Once the physical design data according to the current method is obtained, an integrated circuit 600 may be fabricated according to known processes that are generally described with reference to FIG. 6. Generally, a wafer with multiple copies of the final design may be fabricated and cut (i.e. diced) such that each die is one copy of the integrated circuit 600. At block 610, the processes may include fabricating masks for lithography based on the finalized physical layout. At block 620, fabricating the wafer may include using the masks to perform photolithography and etching. Once the wafer is diced, testing and sorting each die may be performed to filter out any faulty die at block 620.

Figure 7:
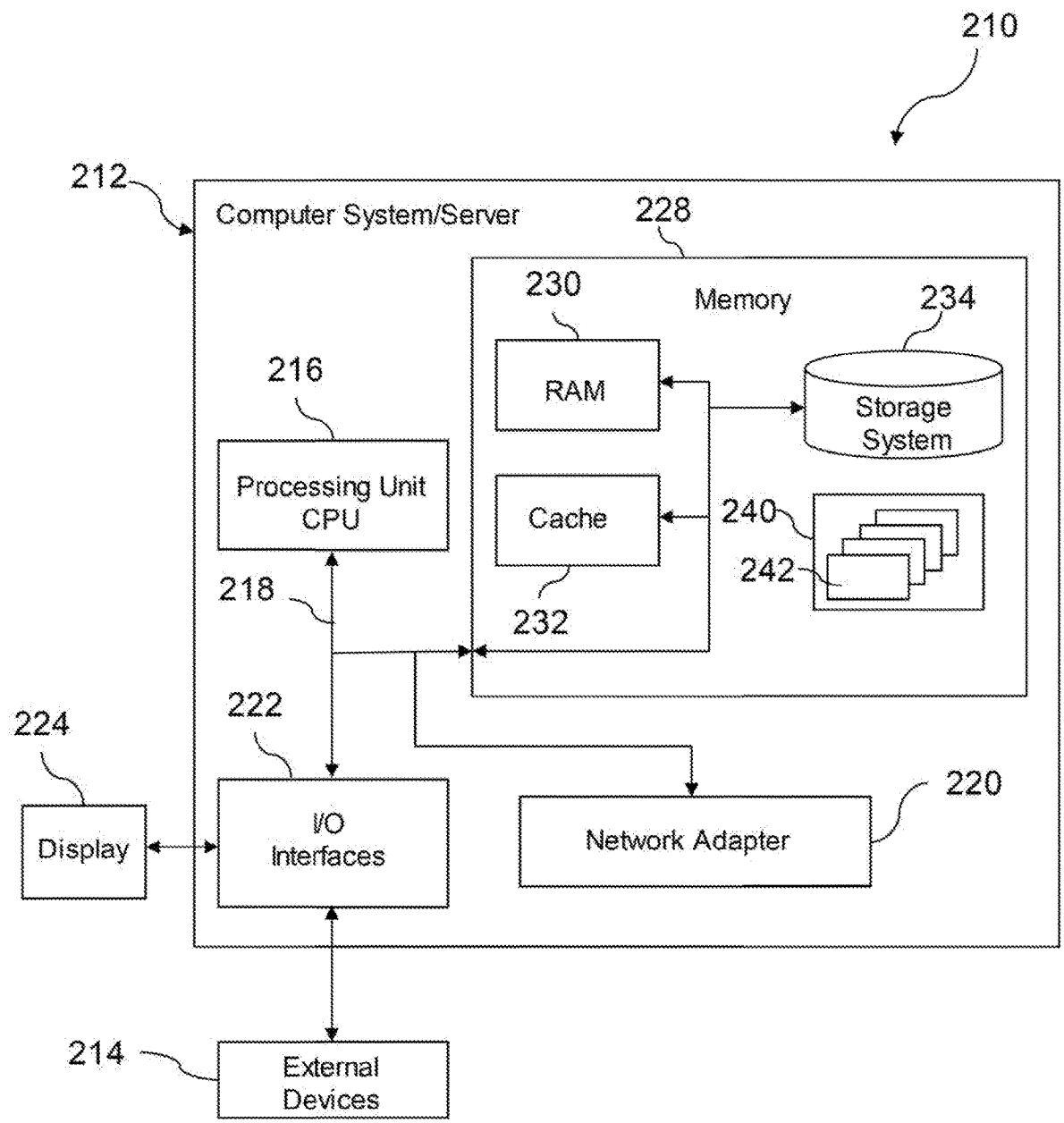
FIG. 7 depicts an example embodiment of a data processing system for executing a method according to the invention.

Referring now to FIG. 7, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 may be capable of being implemented and/or performing any of the functionality set forth herein above.

In data processing system 210, there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 212 in data processing system 210 may be shown in the form of a general-purpose computing device. The components of computer system/server 212 may include, but are not limited to, one or more processors or processing units 216, a system memory 228, and a bus 218 that couples various system components including system memory 228 to processor 216.

Bus 218 may represent one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 may typically include a variety of computer system readable media. Such media may be any available media that is accessible by computer system/server 212, and it may include both volatile and non-volatile media, removable and non-removable media.

System memory 228 may include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 may generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication may occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
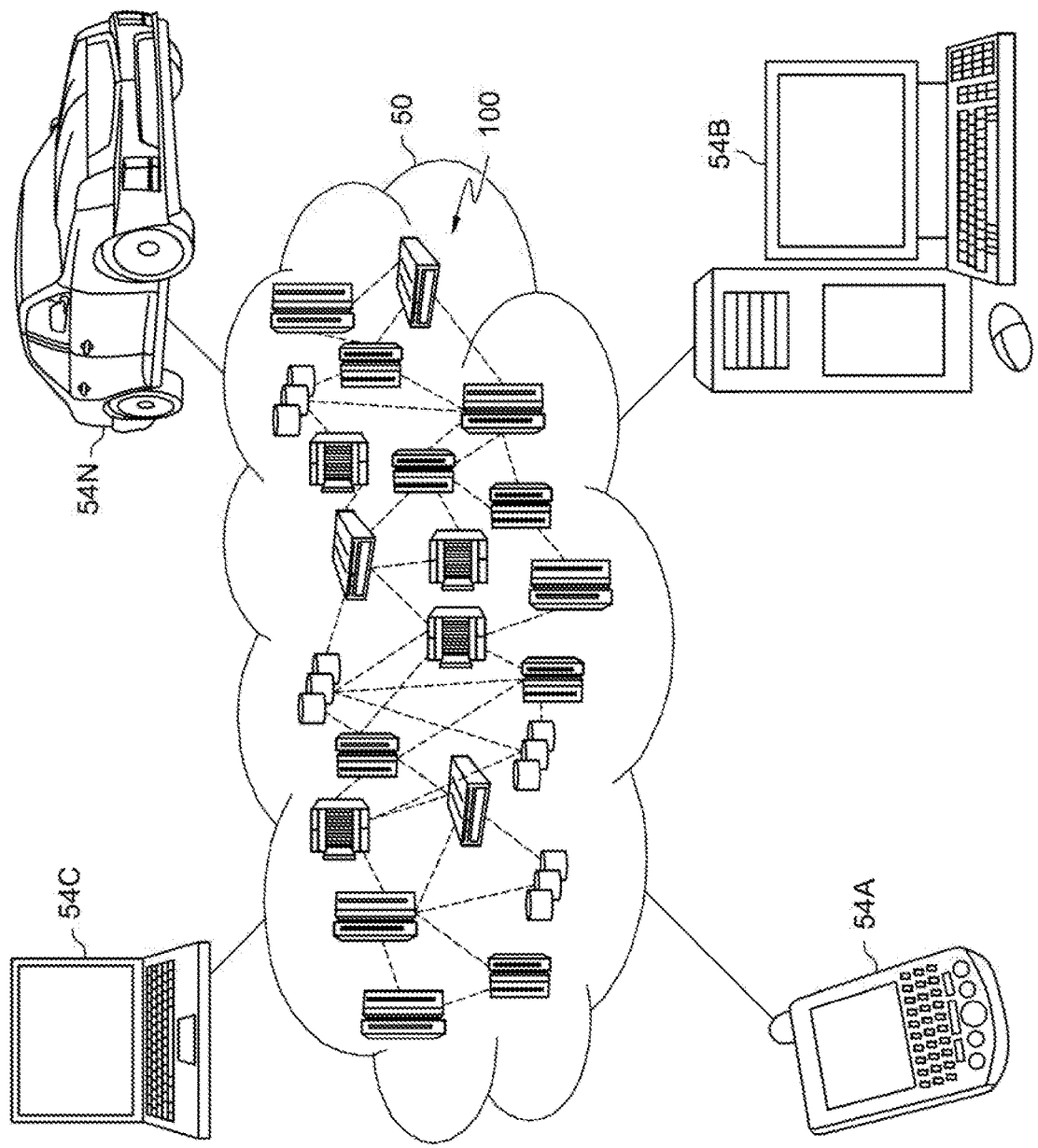
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Figure 9:
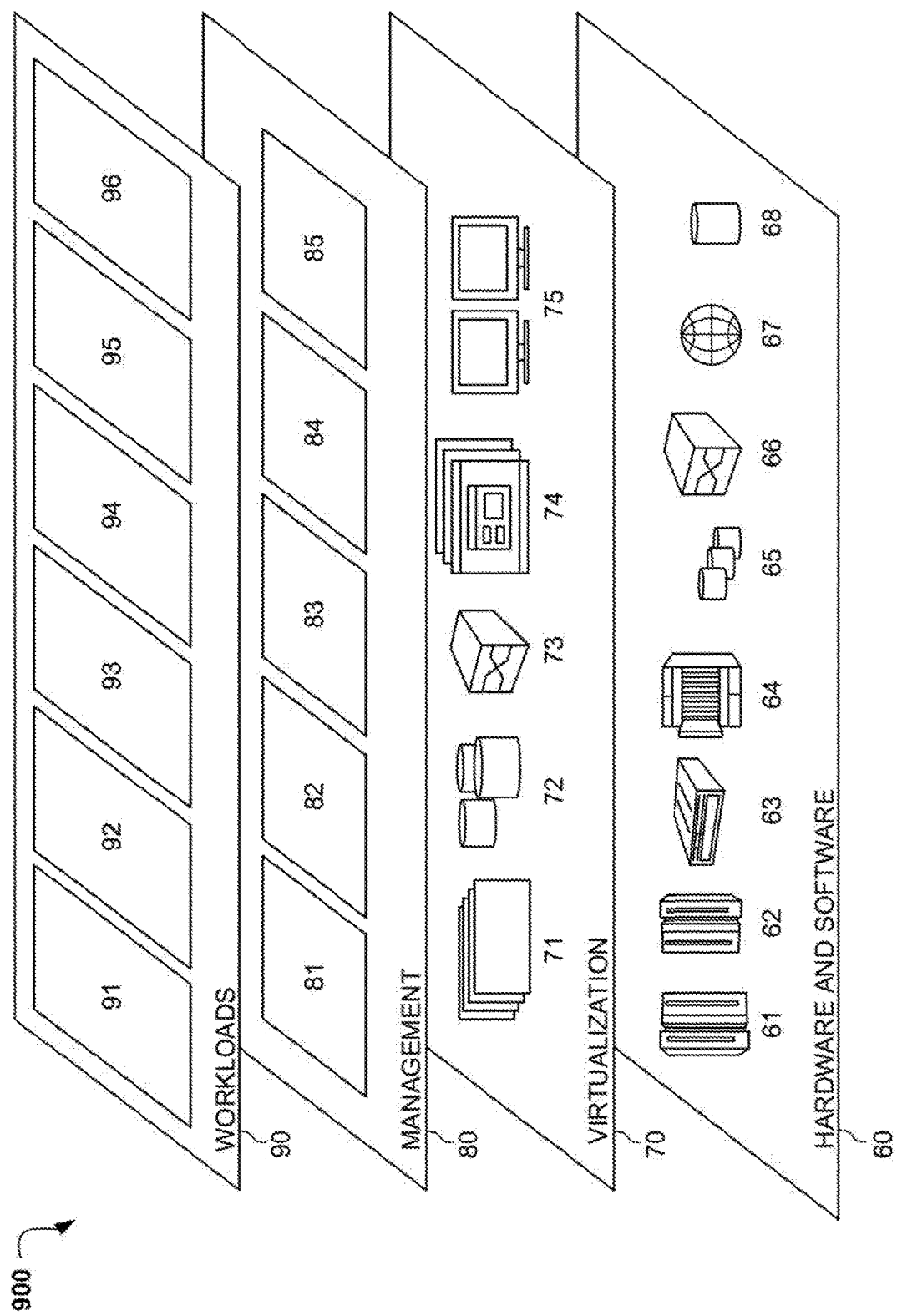
FIG. 9 depicts abstraction model layers according to an embodiment of the present invention.

Referring now to FIG. 9, a set of functional abstraction layers 900 provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and integrated circuit floorplan comparison 96. Integrated circuit floorplan comparison 96 may relate to comparing a first version of a floorplan of a design for an integrated circuit with a second version of the floorplan.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for comparing a first version of a floorplan of a design for an integrated circuit with a second version, wherein wires of the electronic circuit are represented as nets in a netlist and wherein the first version comprises timing information representing net delay values as a function of a wire length or a wire constraint of signal paths, and wherein the second version is a modification of the first version, the method comprising:
generating timing information for each net in the second version by determining whether timing information is available for the net in the first version;
in response to timing information being unavailable in the first version, generating timing information for the second version by calculating a spatial distance and timing information between two points of the net using wire length differences between the first version and the second version; and
in response to the timing information being available for the first version, generating timing information for the second version by calculating a spatial distance and timing information between two points of the net using a wire reach table to obtain a wire delay, wherein the second version of the floorplan is optimized based by minimizing the sum of net delay values as a function of a wire length or a wire constraint of signal paths; and
selecting either said first or second version based on improvements on either timing and/or distance.

2. The method according to claim 1, wherein the second version of the floorplan is a modification of the first version without timing information of the first version.

3. The method according to claim 1, wherein the timing information generated for the second version comprises at least a classification for the net in comparison with the first version.

4. The method according to claim 1, wherein the timing information generated for the second version is used to determine whether a predefined timing criterion is met for the second version.

5. The method according to claim 4, wherein the timing criterion comprises a figure of merit representing a sum of net delay values as a function of a wire length or a wire constraint of signal paths.

6. The method according to claim 5, wherein the second version of the floorplan is optimized based on the figure of merit.

7. The method according to claim 5, wherein the figure of merit comprises a sum of negative values of arrival times of a signal at any point in the floorplan required to meet a timing criterion.

8. The method according to claim 1, wherein calculating a spatial distance and timing information between two points of the net is achieved by calculating a shortest distance between two points of the net using orthogonal branches of the net, in particular by calculating Steiner net lengths.

9. The method according to claim 1, wherein the net list comprising nets represented by net names comprising wires between a source pin and at least one sink pin, and two-dimensional coordinates of the source pin and the at least one sink pin.

10. The method according to claim 9, wherein timing information comprises signal arrival times on each source pin and each sink pin.

11. The method according to claim 10, wherein the signal arrival times are read out from the floorplan of the first version or an additional timing report.

12. The method according to claim 10, wherein a wire delay value is calculated by subtracting a signal arrival time of a source pin from a signal arrival time at a sink pin.

13. The method according to claim 1, wherein the wire reach table comprises wire delay values for a wire length of signal paths of the second version compared to a wire length of signal paths of the first version.

14. The method according to claim 1, wherein timing information for the second version is generated at least for single logic elements of the floorplan.

15. The method according to claim 1, wherein wires are tagged with net categories according to the determined timing information between two points of the net.

16. The method according to claim 15, wherein nets of the second version are grouped into buckets according to tagging information.

17. A computer program product for comparing a first version of a floorplan of a design for an integrated circuit with a second version, wherein wires of the electronic circuit are represented as nets in a netlist and wherein the first version comprises timing information representing net delay values as a function of a wire length or a wire constraint of signal paths, and wherein the second version is a modification of the first version, the computer program product comprising a computer readable storage medium having program instructions embodied therewith, the program instructions executable by a computer system to cause the computer system to perform a method comprising:
generating timing information for each net in the second version by determining whether timing information is available for the net in the first version;
in response to timing information being unavailable in the first version, generating timing information for the second version by calculating a spatial distance and timing information between two points of the net using wire length differences between the first version and the second version; and
in response to the timing information being available for the first version, generating timing information for the second version by calculating a spatial distance and timing information between two points of the net using a wire reach table to obtain a wire delay, wherein the second version of the floorplan is optimized based by minimizing the sum of net delay values as a function of a wire length or a wire constraint of signal paths; and
selecting either said first or second version based on improvements on either timing and/or distance.

18. A data processing system for comparing a first version of a floorplan of a design for an integrated circuit with a second version, wherein wires of the electronic circuit are represented as nets in a netlist and wherein the first version comprises timing information representing net delay values as a function of a wire length or a wire constraint of signal paths, and wherein the second version is a modification of the first version, the data processing system comprising:

one or more computer-readable tangible storage media and program instructions stored on at least one of the one or more tangible storage media, the program instructions executable by a processor of a computer to perform a method, the method comprising:
generating timing information for each net in the second version by determining whether timing information is available for the net in the first version;
in response to timing information being unavailable in the first version, generating timing information for the second version by calculating a spatial distance and timing information between two points of the net using wire length differences between the first version and the second version; and
in response to the timing information being available for the first version, generating timing information for the second version by calculating a spatial distance and timing information between two points of the net using a wire reach table to obtain a wire delay, wherein the second version of the floorplan is optimized based by minimizing the sum of net delay values as a function of a wire length or a wire constraint of signal paths; and
selecting either said first or second version based on improvements on either timing and/or distance.

* * * * *